Nov. 4, 1941.  W. D. COCKRELL  2,261,644
PHOTOELECTRIC CONTOUR FOLLOWER
Filed April 3, 1940  2 Sheets-Sheet 1

Inventor:
William D. Cockrell,
by Harry E. Dunham
His Attorney.

Nov. 4, 1941.   W. D. COCKRELL   2,261,644
PHOTOELECTRIC CONTOUR FOLLOWER
Filed April 3, 1940   2 Sheets-Sheet 2

Inventor:
William D. Cockrell,
by Harry E. Dunham
   His Attorney.

Patented Nov. 4, 1941

2,261,644

UNITED STATES PATENT OFFICE 2,261,644

PHOTOELECTRIC CONTOUR FOLLOWER

William D. Cockrell, Schenectady, N. Y., assignor to General Electric Company, a corporation of New York Application April 3, 1940, Serial No. 327,644

16 Claims. (Cl. 250—41.5)

My invention relates to contour following apparatus and more particularly to a photoelectric contour follower of improved construction.

My invention may be applied to machines, instruments or the like, in which the movements of an operating instrumentality are governed or controlled by a pattern following mechanism.

My invention is particularly applicable to apparatus for accurately and reliably cutting, welding, or carrying out other operations along a path corresponding to the contour of a given pattern or templet, and one application of my invention has been illustrated in the accompanying drawings as applied to one form of gas cutting apparatus embodying a pantograph.

It is an object of my invention to provide apparatus in which the path of travel of a carriage is determined by a steering mechanism which is operated in response to a photoelectric pattern following mechanism of improved construction.

It is a further object of my invention to provide a photoelectric contour following apparatus embodying a follow-up which stabilizes the operation of the apparatus and greatly reduces its tendency to hunt or oscillate.

Further objects of my invention will become apparent from the following description of one embodiment thereof illustrated in the attached drawings.

Figure 1:
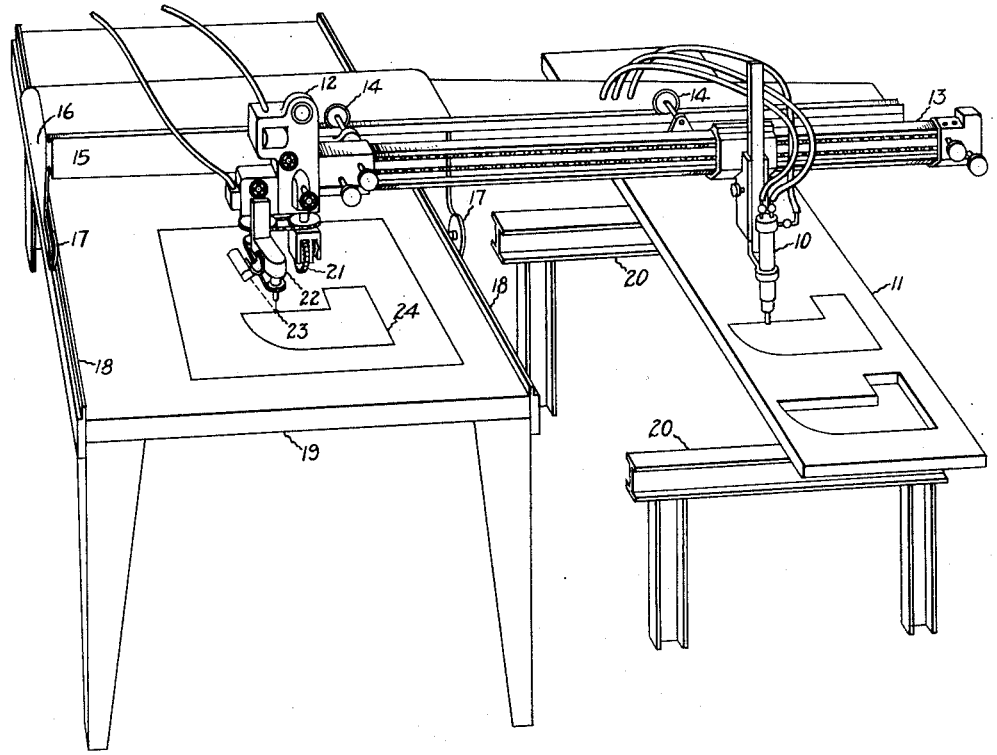
Figure 4:
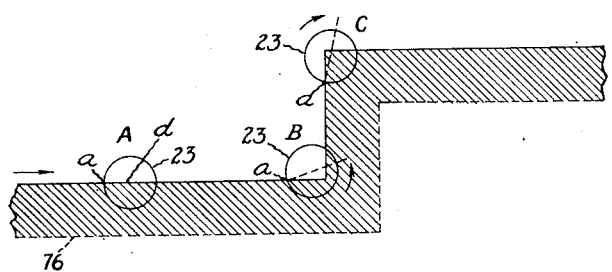
Figure 2:
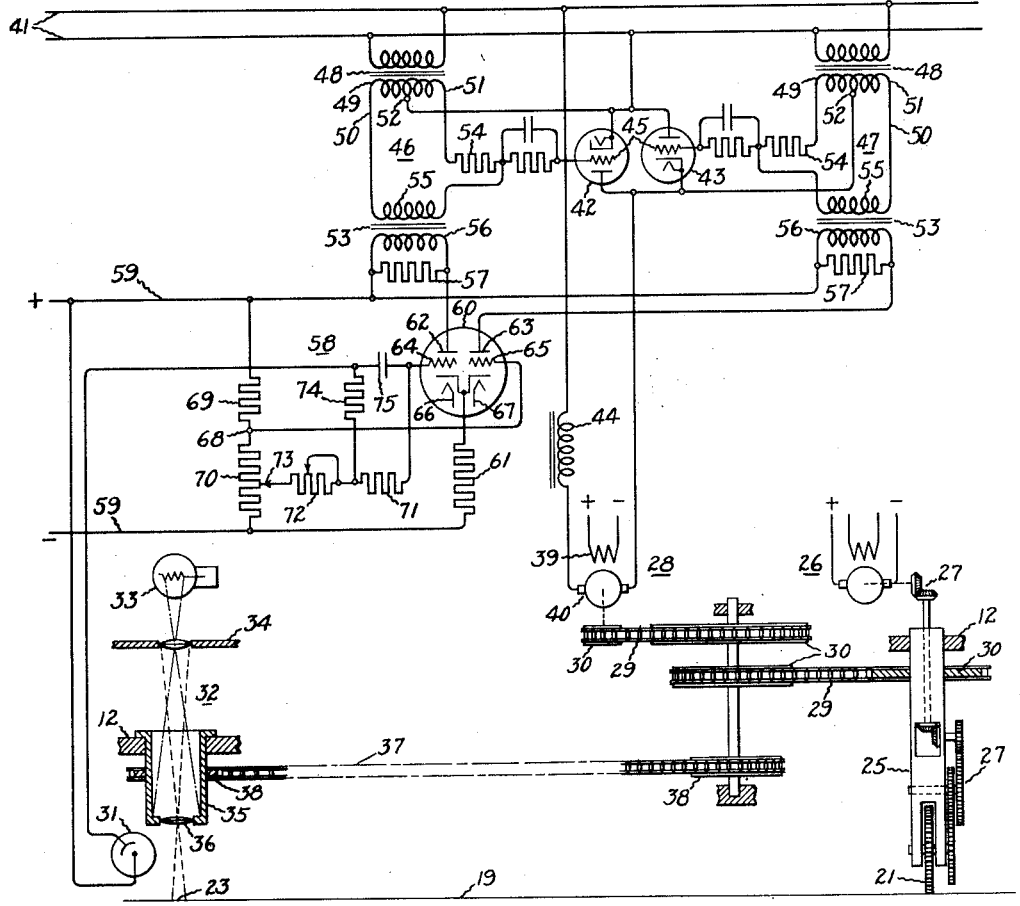
Figure 3:
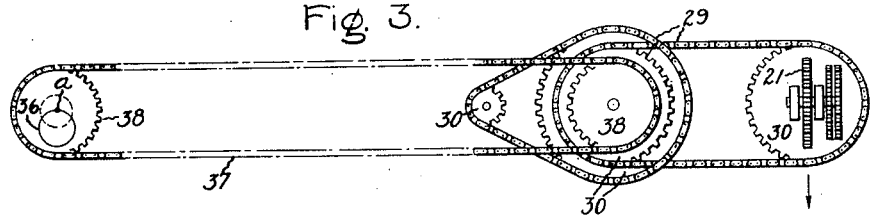

In the attached drawings, Fig. 1 is a perspective view of a gas torch cutting machine embodying my invention; Fig. 2 is a diagrammatic representation of the mechanical and electrical parts of the contour following apparatus forming a part thereof; Fig. 3 is a bottom view of the mechanical parts illustrated in Fig. 2; and Fig. 4 is a diagram which will be used in explaining the operation of the contour following mechanism illustrated in the previous figures.

In the machine illustrated in Fig. 1, a gas cutting torch 10 is mounted for universal movement in a plane substantially parallel to a metal plate 11 from which parts of desired shape are to be cut. The path of movement of torch 10 is controlled by a tracing head 12 embodying propelling, steering, and photoelectric contour following means.

Tracing head 12 and torch 10 are mounted on a carriage 13 which is supported by two pairs of wheels 14 one of each pair of which is mounted above the other and each pair of which travels in the grooved edge portions of a supporting arm 15. This supporting arm forms part of a carriage 16 provided with wheels 17 for movement at right angles to the arm 15 along a track 18 supported on the side edges of a table 19. By reason of its support, carriage 13, which carries torch 10 and tracing head 12, is universally movable in a plane parallel to the top surface of table 19 and also parallel to the plane of the metal plate 11 which rests on supports 20 immediately below torch 10. The arrangement constitutes one well-known form of pantograph apparatus.

Tracing head 12 and torch 10 are propelled and guided over table 19 by a traction wheel 21 which is adapted to engage its top surface. This wheel is steered in its travel over table 19 through the agency of a photoelectric control system, part of which, 22, is shown in Fig. 1 of the drawings. This photoelectric control system includes means for defining a circular light spot 23 on a pattern 24 supported on table 19 and operates in a manner to steer traction wheel 21 so as to direct the light spot with a predetermined amount of overlap along the marginal edges of pattern 24.

The construction of the tracing head and the electrical control forming part thereof are diagrammatically represented in Fig. 2.

As shown in Fig. 2, steering and propelling wheel 21 is mounted in a member 25 which is swivel supported in tracing head 12. It is driven by a variable speed direct current motor 26 through gearing 27 which connects its armature with the axle of wheel 21. By adjusting the field strength of motor 26 its speed and the speed of rotation of wheel 21 may be set at any desired value. The construction and arrangement of parts is quite similar to that illustrated in United States Letters Patent No. 1,059,271, Worthy C. Bucknam, April 15, 1913.

By reason of its swivel support, wheel 21 may be bodily turned about an axis perpendicular to the top surface of table 19. A motor 28 connected through the agency of chains and sprockets 29 and 30 serves to rotate the swivel support 25 for wheel 21 and bodily turn it in order to direct tracing head 12 and frame 13 upon which it is supported in a path of travel determined by the operation of motor 28.

The speed and direction of rotation of motor 28 is under the control of a photoelectric control circuit including a photoelectric cell 31 and means 32 for defining light spot 23 by projecting it onto the pattern whose contour is to be followed by tracing head 12. The light spot projecting means 32 comprises a source of light 33 and a lens system 34, 35.

A part or all of the projecting means 32 may be mounted for turning movement in tracer head 12 so that light spot 23 projected thereby onto the pattern (see Fig. 4) is caused to travel in an orbit about an axis $a$ substantially perpendicular to the top surface of table 19. In the arrangement illustrated, 35 is a cylinder mounted for rotation about an axis offset from the center of a lens 36 which is mounted in a diaphragm closing the lower end of the cylinder. Cylinder 35 is turned about its axis in response to the turning movement of the propelling and steering wheel 21 by being connected with its swivel support 25 through chains and sprockets 29, 30 and 37, 38.

As shown in Figs. 3 and 4, the circular light spot 23 is rotated in a circle about axis $a$ located at the end of its diameter $d$, the arrangement being such that the axis of rotation trails the light spot in its direction of travel over the pattern. The diameter $d$ of the light spot which passes through the pivot point $a$ is at all times maintained parallel with the direction of travel of traction and steering wheel 21 by having the gearing interconnecting cylinder 35 and swivel support 25 for wheel 21 in a 1:1 ratio. It is, of course, apparent that in order to have the light intensity of spot 23 uniform, the beam from lamp 33 projected on the end of cylinder 35 containing lens 36 should be of substantially uniform intensity.

The photoelectric control system for operating steering motor 28 is similar to that disclosed in my United States Letters Patent No. 2,192,735, granted March 5, 1940, and assigned to the same assignee as my present invention. As shown in Fig. 2, motor 28 is a direct current motor having a field 39 and an armature 40. Field 39 is constantly excited by being connected as indicated in the drawings to a source of direct current supply. Armature 40 is connected to a source of alternating current 41 through a pair of reversely connected electric valves 42 and 43 and an inductance 44 which limits the alternating current through the armature at standstill. Electric valves 42 and 43 control the magnitude and direction of current transmitted from source 41 to armature 40 of the steering motor and hence control its speed and direction of rotation. Electric valves 42 and 43 are preferably of the type employing an ionizable medium such as a gas or a vapor and each includes a control member 45 which renders its associated electric valve conductive.

Excitation circuits 46 and 47 are employed for controlling the conductivities of electric valves 42 and 43. These circuits impress on the control members 45 of electric valves 42 and 43 periodic voltages which are variable in phase with respect to their applied anode-cathode voltages. Circuits 46 and 47 are similar in construction and arrangement and each includes a transformer 48 which is energized from the alternating current circuit 41. The secondary winding 49 of each transformer has terminal connections 50 and 51 and electrically intermediate connections 52 which are connected to the cathodes of electric valves 42 and 43. Circuits 46 and 47 also include saturable inductances 53 and resistances 54. Each of the inductances 53 includes a winding 55 which is connected in series with one of the resistances 54 across the terminals 50 and 51 of the secondary windings 49 of transformers 48. Inductances 53 are also provided with windings 56 which control the inductive reactance of windings 55 and hence control the phase shift between the voltages impressed on the control members 45 and the anode-cathode voltages of the electric valves 42 and 43. Resistances 57 may be connected across control windings 56 to limit the rate at which the control voltages which are impressed on control members 45 may be shifted in phase.

A circuit 58 is provided for controlling the amount of current transmitted to control windings 56 of saturable inductances 53 of control circuits 46 and 47. These control windings are connected across a source of direct current 59 through an electronic discharge device 60 and a resistance 61. The electronic discharge device 60 is preferably of the high vacuum type comprising pairs of anodes 62 and 63, control grids 64 and 65 and cathodes 66 and 67. The cathodes are connected together and to the negative terminal of the direct current source 59 through resistance 61 which controls the potential of the cathodes so that the sum of the currents conducted by the two discharge paths through device 60 remains substantially constant, as pointed out in detail in my United States Letters Patent 2,175,017, granted October 3, 1939, and assigned to the same assignee as my present invention.

Control grid 65 of electronic discharge device 60 is connected at 68 to a potentiometer including resistances 69 and 70 which are connected in series relation across the direct current source 59. Control grid 64 of electronic discharge device 60 is connected through a resistance 71 and a rheostat 72 to a slider 73 engaging resistance 70. As a means of varying the control potential impressed on control grid 64 in accordance with the light received by the photoelectric cell 31, resistance 72 is connected across the source of direct current supply 59 through a portion of resistance 70, resistances 72 and 74, and photoelectric cell 31.

An anti-hunting connection including resistances 71 and 74 and condenser 75 is also provided in the control circuit connected to the grid 64 of electronic discharge device 60. It will be noted that so long as the light on the photoelectric cell 31 is constant, the potential on control grid 64 will be determined by the voltage drop across resistance 72. However, at the instant of light change, the effect of the dynamic coupling circuit including resistances 71 and 74 and capacitance 75 will be superimposed on the static effect of resistance 72. For example, if, due to decreased conductivity of photoelectric cell 31, the voltage drop across resistances 72 and 74 decreases, the voltage on the condenser 75 will circulate a current through resistances 74 and 71 producing a voltage drop in resistance 71 which being connected in series with resistance 72 momentarily further decreases the control potential on grid 64 of electronic discharge device 60 until static conditions again obtain when the voltage drop of resistance 72 alone determines the control potential impressed on control grid 64 of electronic discharge device 60.

The operation of the above described contour following apparatus is as follows:

Assuming that the pattern 24 is a black line on white paper, the apparatus is preferably adjusted by moving the slider 73 so that the light spot 23 when projected on a black area rotates at a maximum speed in one direction and the rheostat 72 is adjusted so that the light spot 23 when projected on a white area rotates in the opposite direction at substantially the same speed. The speed of the propelling motor 26 is also adjusted so that traction wheel 21 rotates at a desired speed chosen in accordance with the thickness and nature of the part being cut by the gas torch 10 from the metal plate 11.

With these adjustments, when the light spot 23 splits evenly at the edge of a line 76 defining the contour of the pattern, the steering motor 28 is stationary. Consequently, under balanced conditions when making a straight cut, the light spot 23 splits evenly at an edge of a line drawing or pattern as at A in Fig. 4. If, for example, the spot is 1/16" in diameter, it is desirable that the line be at least 1/16" wide and it has been found desirable to increase this width at corners or other points of sharp directional change to prevent loss of control if there is a small amount of vibration or hunting.

When the light spot approaches an inside corner such as at B, Fig. 4, more light will be absorbed by the black contour line of the pattern, less light will be received by photoelectric cell 31, and the resulting unbalance will cause the steering motor 28 to rotate in the proper direction to steer the contour follower in the proper direction, to permit more light to fall on the photoelectric cell 31. When the amount of light falling on photoelectric cell 31 decreases, its electrical resistance increases and the voltage drop across resistance 72 decreases, thus decreasing the amount of current transmitted by electronic discharge device 60 to the control winding 56 of saturable inductance 53 in the excitation circuit 46 for electric valve 42. This will increase the impedance of inductance 53 retarding the phase of the voltage applied to the grid 45 of electric valve 42 relative to its anode-cathode voltage. Electric valve 42 will consequently conduct less current. At the same time electronic discharge device 60 conducts more current to control winding 56 of saturable inductance 53 in excitation circuit 47 for electric valve 43 advancing the phase of the voltage applied to the grid 45 of electric valve 43 relative to its anode-cathode voltage. This will supply through the armature 40 of steering motor 28 a resultant flow of current which is in the proper direction to rotate it and the steering wheel 28 in the proper direction to move the contour follower and the light spot projected therefrom in a proper direction to again establish balanced conditions determined by the receipt of a predetermined amount of light by photoelectric cell 31.

When the light spot 23 is at B in Fig. 4, it will be noted that as the machine proceeds the light spot and steering wheel 21 are turned more and more to the right angle position until it is moving in the new direction. Since the light spot is turned in the same direction as the steering wheel, there is little or no tendency for the steering wheel to turn so rapidly as to spin and consequently lose control. Furthermore, the rate of turning is damped by the simultaneous swinging of the light spot about its axis $a$ and as this decreases variations in the intensity of light received from the spot by the photoelectric cell there is very little tendency for the contour following device to hunt or oscillate as would be the case if the spot were not rotated so as to move relative to the tracing head and it were necessary for the machine as a whole to move in order to reestablish equilibrium.

When the light spot approaches an outside corner such as at C, more light will be reflected onto the photoelectric cell 31 and the resulting unbalance will cause the steering motor 28 to rotate in the proper direction to move the contour follower and light spot to re-establish the balanced condition for which the system is set. Due to the increased light falling on the photoelectric cell when the spot arrives in position C, the system will operate in a manner similar to that described above to supply current to the steering motor 28 in a direction opposite to that which occurred when the light spot was in position B. When the light spot arrives at the outside corner C, it again swings about its axis $a$ in the new direction of travel and this follow-up functions as above described in order to prevent hunting of the apparatus controlled by the photoelectric system.

It is, of course, not necessary to employ, as illustrated, a circular light spot or to rotate it about an axis passing through one end of its diameter. Light spots of regular or irregular configuration may be used and the apparatus for defining these light spots on a pattern may be mounted for rotation about any desired axis though preferably the axis of rotation should trail with regard to its travel the axis about which the light spot may be rotated without substantially changing its overlap on a marginal edge of the pattern.

Under certain circumstances, it may not be necessary to have the light spot travel through the same angular displacement as the steering mechanism. For example, the gearing interconnecting cylinder 35 and swivel support 25 for wheel 21 need not be in a 1:1 ratio.

Variations of the principles involved in my invention will readily suggest themselves to those skilled in the art in view of the particular embodiment above illustrated and described. For example, the pattern need not be produced by black lines on a white background since white lines on a black background, or, in fact, any contrasting color combination will control the amount of light received by the photoelectric cell from the light spot. Furthermore, the pattern may be a transparency carrying a translucent or opaque design in which case the light spot projecting means and photoelectric cell would be located on opposite sides of the transparency. Furthermore, the pattern may in itself be a physical object which is suitably supported relative to the photoelectric pattern following device in order to accomplish the desired results.

Heretofore, various mechanical and electromechanical contour following mechanisms have been employed for directing the cutting torches of automatic metal cutting machines. In each case, the pattern is essentially a track shaped into the contour of a pattern or a pattern of magnetic material. In such apparatus, difficulty is always encountered in the follower passing uniformly about the contour of the pattern. Moreover, a large number of patterns must be stocked where the work performed by any machine is greatly varied and considerable time and effort is required in fabricating a pattern when new shapes are to be cut. When employing my invention, however, the pattern may be readily applied to paper, cardboard or a transparency, and these patterns may be readily stored or made anew when required. For example, when a single cut is to be made, the drawing normally employed for directing hand controlled machines of this type may be used in an automatic machine embodying my invention if the outline is defined by a line of sufficient thickness for the light spot of the contour follower.

My invention is applicable to all forms of contour following apparatus and is not limited to gas cutting or welding machines of the type above described. For example, the follow-up control forming part of my invention may also be applied to curve following instruments such as are employed for controlling operations in accordance with the form of a graphic chart or to similar devices.

Consequently, while I have shown and described my invention as applied to a particular apparatus actuated by a particular photoelectric control system, it is obvious to those skilled in the art that various changes and modifications may be made in applying my invention to photoelectric contour following apparatus without departing from my invention, and I, therefore, aim in the appended claims to cover all such changes and modifications as fall within the true spirit and scope of my invention.

What I claim as new and desire to secure by Letters Patent of the United States is:

1. Photoelectric apparatus comprising means for defining a light spot on a pattern, a photoelectric cell responsive to light received from said light spot, a driven member, means including a control system embodying said photoelectric cell for operating said driven member, and means actuated by the movement of said driven member for rotating said light spot defining means and the light spot defined thereby about an axis offset from the axis about which said light spot may be rotated without substantially changing its overlap on a marginal edge of said pattern.

2. Photoelectric apparatus comprising a support for a pattern, means for projecting a light spot on said pattern, a photoelectric cell responsive to light received from said light projecting means, means for traversing said projecting means and said photoelectric cell and said support and said pattern mounted thereon relatively to one another, means including a driven member for steering said traversing means in a manner to direct said light spot with a predetermined amount of overlap along a marginal edge of said pattern, means including a control system embodying said photoelectric cell for operating said driven member, and means actuated by the movement of said driven member for rotating said light projecting means and the light spot produced thereby about an axis offset from the axis about which said light spot may be rotated without substantially changing its overlap on a marginal edge of said pattern.

3. Apparatus comprising a carriage, means for supporting a pattern, means on said carriage for projecting a light spot onto said pattern, means including a photoelectric cell for moving said carriage relatively to said pattern supporting means and for directing said light spot with a predetermined amount of overlap along a marginal edge of said pattern, and follow-up means for moving said photoelectric cell and said projecting means and the light spot produced thereby relatively to one another in response to changes in the direction of movement of said carriage.

4. Apparatus comprising a carriage, a support for a pattern, means for positioning said carriage relative to said support and said pattern mounted thereon, means for projecting light on said pattern, means including a photoelectric cell responsive to variations in the pattern controlled intensity of light received from said projecting means for operating said positioning means to change the position of said carriage relative to said support and said pattern mounted thereon, and means responsive to the movement of said operating means for decreasing variations in light intensity received from said projecting means by said photoelectric cell from that resulting from the change in position of said carriage relative to said support and said pattern mounted thereon.

5. A pantograph apparatus comprising a carriage mounted for universal movement, means for propelling said carriage, steering means for guiding the movement of said carriage, means for supporting and illuminating a pattern, means including a photoelectric pattern following mechanism responsive to light received from said pattern for operating said steering means and directing said carriage in a path of travel corresponding to the contour of said pattern, and follow-up means responsive to the movement of said steering means for decreasing variations in light received from said pattern by said photoelectric pattern following means from that resulting from the movement of said carriage under the control of said steering means.

6. Apparatus comprising a carriage, means for supporting a pattern, means on said carriage for projecting a light spot onto said pattern, means for steering said carriage, means including a photoelectric cell for operating said steering means, and follow-up means for moving said photoelectric cell and said projecting means and light spot produced thereby relatively to one another in response to the movement of said steering means.

7. A pantograph apparatus comprising a carriage mounted for universal movement, means for propelling said carriage, steering means for guiding the movement of said carriage, means for supporting a pattern, means mounted on said carriage for defining a light spot on said pattern, means including a photoelectric cell control for operating said steering means in a manner to direct said light spot with a predetermined amount of overlap along the marginal edges of said pattern, and means responsive to the movement of said steering means for moving said light spot defining means and the light spot defined thereby relatively to said carriage in the same direction as the movement of said carriage relative to said pattern under the control of said steering means.

8. Apparatus comprising a carriage, means for supporting a pattern, means on said carriage for projecting a light spot onto said pattern, means including a photoelectric control system for moving said carriage relatively to said pattern to position said light spot with a predetermined overlap on a marginal edge of said pattern, and means for moving said projecting means and light spot produced thereby relatively to said carriage in response to the operation of said carriage moving means.

9. Apparatus comprising a carriage, means for supporting a pattern, means on said carriage for projecting a light spot onto said pattern, means including a photoelectric control system for moving said carriage relatively to said pattern to position said light spot with a predetermined overlap on a marginal edge of said pattern, and means responsive to the operation of said carriage moving means for moving said projecting means and light spot produced thereby relatively to said carriage in the same direction as the movement of said carriage relative to said pattern.

10. A pantograph apparatus comprising a carriage mounted for universal movement, means for propelling said carriage, steering means for guiding the movement of said carriage, means for supporting a pattern, means on said carriage for projecting a light spot onto said pattern, photoelectric control means for operating said steering means to direct said carriage along a path of travel determined by a predetermined overlap of said light spot with the marginal edges of said pattern, and means for moving said projecting means and the light spot produced thereby relatively to said carriage in response to the movement of said steering means.

11. A pantograph apparatus comprising a carriage mounted for universal movement, means for propelling said carriage, steering means for guiding the movement of said carriage, means for supporting a pattern, means on said carriage for projecting a light spot onto said pattern, photoelectric control means for operating said steering means to direct said carriage along a path of travel determined by a predetermined overlap of said light spot with the marginal edges of said pattern, and means responsive to the operation of said steering means for simultaneously moving said projecting means and the light spot produced thereby relatively to said carriage in a direction stabilizing the operation of said photoelectric control means.

12. A pantograph apparatus comprising a carriage mounted for universal movement, means for propelling said carriage, steering means rotatably mounted on said carriage for guiding the movement of said carriage, means for supporting a pattern, means rotatably mounted on said carriage for projecting a light spot on said pattern and rotating it about an axis trailing the center of said light spot in its movement relative to said pattern, means including a photoelectric cell control for rotating said steering means in a manner to direct said light spot with a predetermined amount of overlap along the marginal edges of said pattern, and means responsive to the rotation of said steering means for simultaneously rotating in the same direction said projecting means and the light spot produced thereby.

13. A pantograph apparatus comprising a support, a carriage mounted for universal movement relative to a surface of said support, a steering wheel adapted to engage said surface of said support and swiveled on said carriage for turning movement about an axis substantially perpendicular to such surface of said support, means mounted on said carriage for rotating a light spot projected thereby about an axis trailing its center in its movement along said pattern, means including a photoelectric cell control for turning said steering wheel in its swivel support to direct said carriage in a manner to position said light spot with a predetermined amount of overlap along a marginal edge of said pattern, and means responsive to the turning of said steering wheel for simultaneously turning said light spot in the same direction about its axis through the operation of said light spot rotating means.

14. A pantograph apparatus comprising a carriage mounted for universal movement, means for propelling said carriage, steering means swivel-mounted on said carriage, means for supporting a pattern, means for projecting a light spot on said pattern, means for supporting said projecting means on said carriage for turning movement that directs said light spot about an axis trailing with regard to its travel the axis about which said light spot may rotate without substantially changing its overlap on a marginal edge of said pattern, means including a photoelectric cell control for turning said steering means in its swivel mounting to direct said carriage along a path such that said light spot travels along a marginal edge of said pattern with a predetermined amount of overlap, and means responsive to the turning of said steering means for simultaneously turning said projecting means in its support on said carriage.

15. A pantograph apparatus comprising a support, a carriage mounted for universal movement relative to a surface of said support, a steering wheel adapted to engage said surface of said support and swiveled on said carriage for turning movement about an axis substantially perpendicular to said surface of said support, means for projecting a light spot on a pattern located on said surface of said support, means including a photoelectric cell control for turning said steering wheel in its swivel support to direct said carriage in a manner to position said light spot with a predetermined amount of overlap along a marginal edge of said pattern, and means responsive to the turning of said steering wheel in its swivel support for simultaneously turning said light spot in the same direction about an axis trailing with regard to its travel the axis about which it may rotate without substantially changing its overlap on a marginal edge of said pattern.

16. A pantograph apparatus comprising a support, a carriage mounted for universal movement relative to a surface of said support, a steering wheel adapted to engage said surface of said support and swiveled on said carriage for turning movement about an axis substantially perpendicular to said surface of said support, means for rotating said wheel at a substantially uniform rate of speed, means for projecting a light spot on a pattern located on said surface of said support, means including a photoelectric cell control for turning said steering wheel in its swivel support to direct said carriage in a manner to position said light spot with a predetermined amount of overlap along a marginal edge of said pattern, and means responsive to the turning of said steering wheel in its swivel support for simultaneously turning in the same direction and through the same angular displacement said light spot about an axis trailing with regard to its travel the axis about which it may rotate without substantially changing its overlap on a marginal edge of said pattern.

WILLIAM D. COCKRELL.